(No Model.)
C. HUCK.
TELEPHONE AND TELEGRAPH CABLE.
No. 284,426. Patented Sept. 4, 1883.
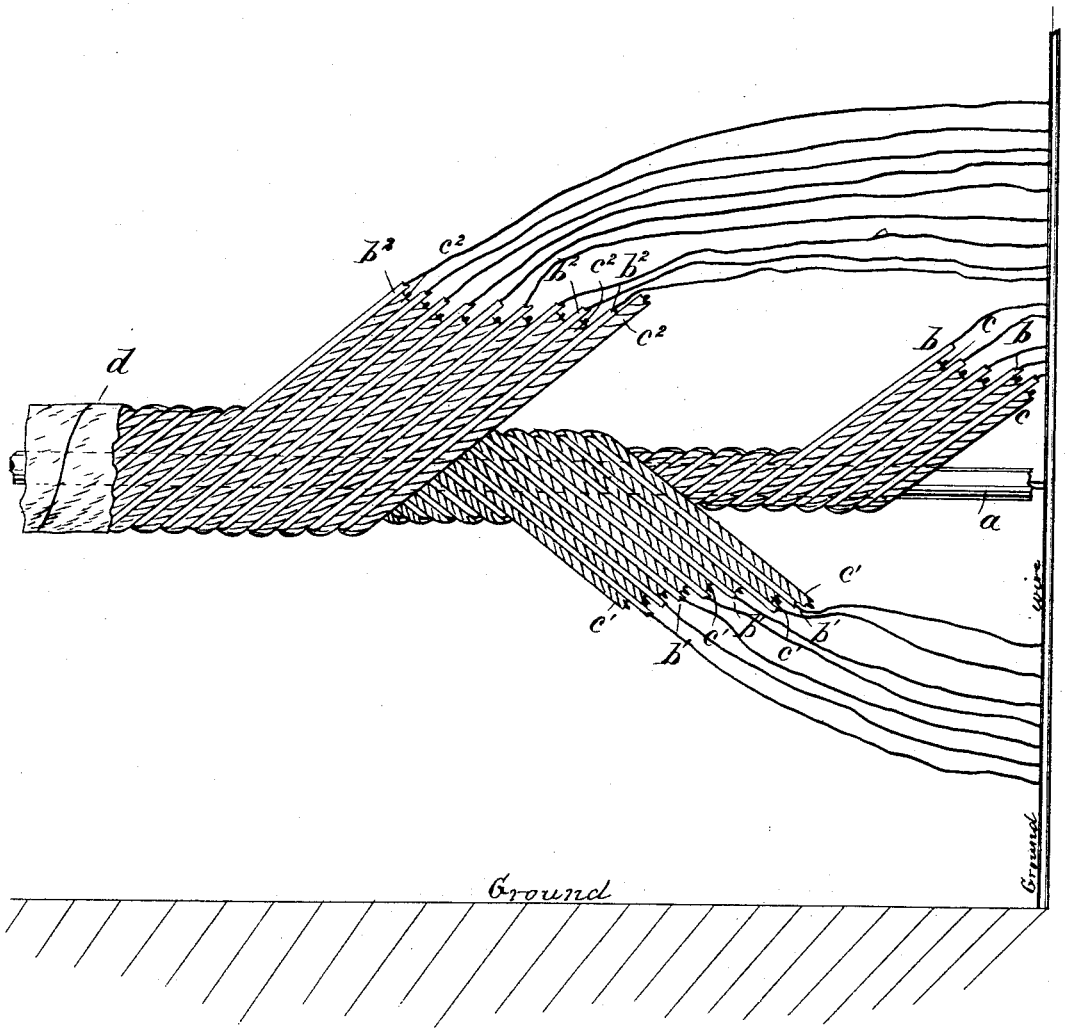
WITNESSES:
Donn Twitchell.
C. Sedgwick
INVENTOR:
C. Huck
BY Munn & Co.
ATTORNEYS.

UNITED STATES PATENT OFFICE.

CHARLES HUCK, OF NEW ORLEANS, LOUISIANA.

TELEPHONE AND TELEGRAPH CABLE.

SPECIFICATION forming part of Letters Patent No. 284,426, dated September 4, 1883.

Application filed May 7, 1883. (No model.)

*To all whom it may concern:*

Be it known that I, CHARLES HUCK, of New Orleans, in the parish of Orleans and State of Louisiana, have invented a new and Improved Telephone and Telegraph Cable, of which the following is a full, clear, and exact description.

The object of my invention is to provide a new and improved telephone and telegraph cable in which bare wires are provided for carrying off the induced currents, which bare wires are so arranged that they cannot cut the insulating-wires.

Reference is to be had to the accompanying drawing, forming part of this specification, in which a longitudinal view of my improved telephone and telegraph cable is shown, the several wires being partly unwound.

A bare copper or other good conducting wire, $a$, forms the center of the cable, and around the wire $a$ a layer composed of alternate bare and insulated wire $b$ and $c$, respectively, is wound spirally. The said layer of wires $b$ and $c$ is surrounded by a like spiral layer, composed of alternating bare and insulated wires $b'$ $c'$, which second layer is wound in the inverse direction of the first. The second layer is surrounded by a like third layer, $b^2$ $c^2$, wound spirally in the inverse direction of the second and in the same direction as the first, and so on. The outermost layer is surrounded by a layer, $d$, of insulating material, which in turn is surrounded by a protective covering, in the usual manner of covering cables.

The bare wires, which are ground-wires, are connected with the earth, so as to carry off the induced current from the several insulated wires. Each insulated wire in each layer acts as a separate conductor to form an earth circuit; or any two insulated wires may be used to form a metallic circuit. Any number of layers and wires may be provided, according to the desired capacity of the cable.

With the arrangement of the wires as described and shown the bare wires carry off the induced current more perfectly than if they were straight, and they are not so apt to cut the insulated wires. The cable is also strengthened by winding the wires in the manner set forth.

Each layer of wires may be covered or wrapped with a good insulating substance, material, or cloth to more perfectly insulate the wires or layers of wires from each other.

The wires composing this cable can be made of copper or any good conducting material.

Having thus described my invention, what I claim as new, and desire to secure by Letters Patent, is—

A telephone and telegraphic cable having a conducting-core wire arranged longitudinally therethrough, and a layer of alternate bare and insulated wires spirally wound about said conducting-wire, the bare wires being connected with core-wire throughout its entire length, and the ends of said wires being connected with the earth, as described.

CHARLES HUCK.

Witnesses:
W. W. HUCK,
W. S. DELANY.